Sept. 19, 1961 A. L. G. CIANCHI 3,000,745
VITREOUS MATERIALS
Filed Sept. 12, 1956
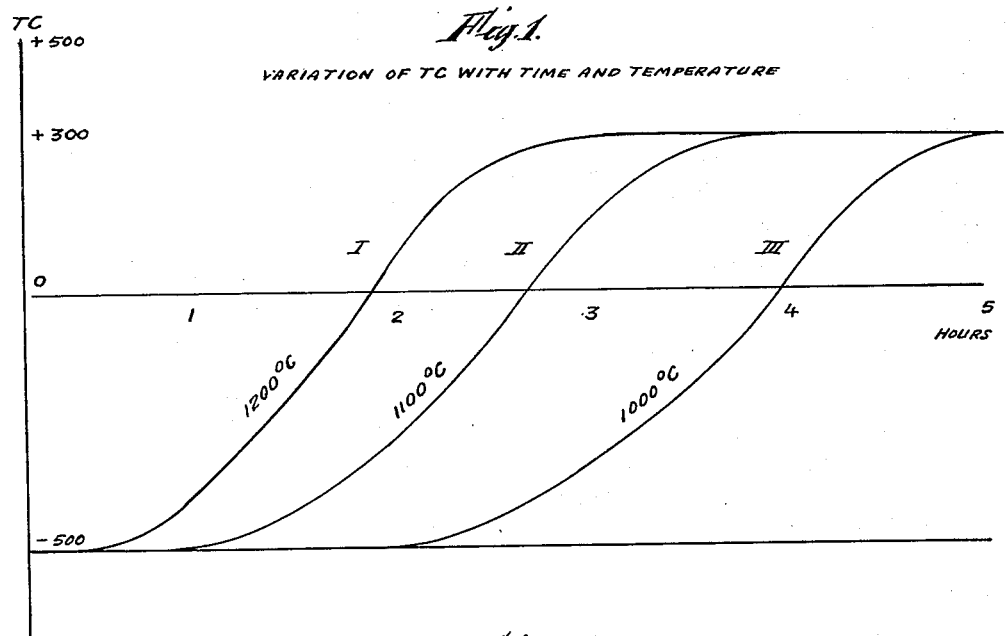
*Fig. 1.*
VARIATION OF TC WITH TIME AND TEMPERATURE
*Fig. 2.*
*Fig. 3.*
Inventor
Alfredo L. G. Cianchi
by Albert Jacobs
attorney

United States Patent Office 3,000,745
Patented Sept. 19, 1961

3,000,745
VITREOUS MATERIALS
Alfredo Luigi Giuseppe Cianchi, Ashridge Park, Little Gaddesden, England, assignor to Welwyn Electrical Laboratories Limited, Bedlington Station, England, a company of Great Britain and Northern Ireland
Filed Sept. 12, 1956, Ser. No. 609,473
Claims priority, application Great Britain Feb. 25, 1955
10 Claims. (Cl. 106—39)

This invention is a continuation-in-part of the invention disclosed in application Serial No. 569,296, filed on February 23, 1956, now abandoned.

This invention relates to novel vitreous materials manufactured from oxides and suitable for use as dielectrics in electrical capacitors, having a pre-determined temperature coefficient of capacitance over a wide range, and to methods of making them. The term vitreous as used herein means glass-like in lustre, colour, hardness and brittleness, and having undergone fusion or bonding at a high temperature, the process of fusion being characterised by the fact that there is no definite melting point.

In one particular aspect the invention relates to vitreous dielectric materials which become mouldable at comparatively low temperatures between 450°–700° C., so that they can be easily moulded to any desired shape without affecting the electrical characteristics obtained during the process of manufacture.

In another particular aspect the invention provides novel vitreous insulating materials characterized by containing crystalline matter. That is, a crystalline structure in these novel materials can be achieved during the process of manufacture so as to obtain preferred electrical characteristics.

During the process of manufacture described hereinafter the crystalline matter in the vitreous material is believed to undergo a progressive structural change dependent upon the temperature at which the batch of raw materials is fired and the length of time at which the molten batch is kept at a chosen temperature. Change in the crystalline structure results in a change in electrical characteristics, particularly changes in the temperature coefficient of capacitance. By rapidly quenching the molten batch, the crystalline structure existing at the moment of quenching remains fixed and thus materials of low power factor and zero, positive or negative temperature coefficient of capacitance can be produced. Furthermore, the vitreous materials described hereinafter being of low softening point as herein defined generally have good moulding characteristics and a comparatively high coefficient of thermal expansion so that they can be bonded to copper or even aluminum without an intermediate glass.

It is common knowledge that ceramic dielectrics of high dielectric constant and relatively low loss values can be made by known ceramic methods from a mix containing titanium dioxide and free from alkali metal oxides. It is also known that such mixes having a high titanium dioxide content give rise to ceramic dielectrics having negative temperature coefficient of capacitance and consequently that dielectrics of zero or predetermined temperature coefficient of capacitance can be produced by employing a mix containing titanium dioxide in balanced proportion with other conventional ceramic ingredients known to give rise to products of positive temperature coefficient of capacitance. Thus, a ceramic dielectric with low temperature coefficient can be obtained from a mix containing 40 parts by weight of silica, 25 parts by weight of alumina, 10 parts by weight of magnesium oxide and 35 parts by weight of titanium dioxide which can be sintered at a temperature of 1400° C. It has not, however, been possible to manufacture such ceramic dielectrics of negligible temperature coefficient of capacitance with reproducible results and the variations of the temperature coefficient of capacitance between batches has been a serious drawback to the commercial employment of these dielectrics.

It has now been found that the addition of silicon, potassium, sodium and lithium oxides to glasses containing titanium dioxide results in the formation of novel vitreous materials which have a pre-determined temperature coefficient of capacitance and a great stability of electrical properties and uniformity over a wide temperature range. Materials containing mixtures of titanates and glass substances are well known, but these materials are in general found to be unsatisfactory because when sintered to reduce porosity the glass alters the characteristics of the titanates in a manner which is unpredictable and results in an unstable product with varying electrical properties. On the other hand, the vitreous materials of the present invention described hereinafter are inherently glass-like materials which combine advantages of a dielectric containing titanium dioxide with stability met with in a good insulating glass. These characteristics are maintained to a large extent or entirely even when the novel dielectric materials of the present invention are milled together with suitable glasses of a much lower softening point, to form powders that can be applied to metals in the form of a slip or by spraying or they can be sintered in any desired form.

It is thought that these characteristics result from the partly crystalline nature of these novel materials. The nature and amount of crystalline content of these novel materials will affect their physical properties, particularly the dielectric constant and its temperature coefficient. The desired electrical characteristics, which depend on the crystalline content, may be obtained by controlling the temperature of the firing and the length of time at which the molten batch of vitreous material is kept at any chosen temperature and the rate of cooling of the batch. A rapid increase of viscosity as the temperature of these materials is lowered below 700° C. is the essential reason for the stability of these glassy substances. As the hot, highly mobile vitreous material is rapidly quenched the increased viscosity prevents further crystal changes, so that these crystal changes can be brought to an end at any desired stage thus obtaining materials of different electrical characteristics.

Thus, the present invention consists in a vitreous dielectric material containing crystalline matter, having a softening point, as herein defined, less than 700° C., a dielectric constant greater than 15, a power factor not greater than 0.003 and a temperature coefficient of capacitance of from +300 to −500 parts per million per degree C.

As used herein the term "softening point" in relation to vitreous dielectric materials means the temperature at which the viscosity is $10^{12}$ poises. This definition corresponds to a temperature at which the linear expansion of the specimen measured on a dilatometer reaches a maximum value and is in accord with recommendations issued by the Deutsche Glastechnische Gesellschaft and the Society of Glass Technology (J. Soc. Glass Tech., 1930, 14, 159).

The present invention also consists in a vitreous dielectric material containing crystalline matter, having a softening point, as herein defined, lower than 700° C., a dielectric constant greater than 15, a power factor not greater than 0.003 and a temperature coefficient of capacitance of from +300 to −500 parts per million per degree C., said material having a composition equivalent to a mixture of a total of 50–70% by weight of the oxides of titanium, barium, lead, tin, calcium and strontium, a total of 6–25% by weight of at least one material selected from the oxides and fluorides of potassium, sodium and lithium, the remainder of said mixture being the oxides of silicon, zirconium, antimony and magnesium and, optionally, at least one material selected from phosphorus pentoxide, boric oxide and an alkali earth metal fluoride, the amounts of any fluorides being such that the fluorine content of the vitreous dielectric material does not exceed 6% by weight.

It must be understood that the phosphorus pentoxide, boric oxide and calcium fluoride may be admixed either severally or two or three at a time to the starting material from which the vitreous dielectric material of the invention is made.

According to the invention also, a vitreous dielectric material contains crystalline matter and has a softening point, as herein defined, below 700° C. and a composition equivalent to a mass comprising a mixture of the following oxides in the following proportions:

| | Parts by weight | | Parts by weight |
|---|---|---|---|
| $TiO_2$ | 14–35 | $Sb_2O_3$ | 0.5–3 |
| PbO | 10–30 | $K_2O$ | 7–20 |
| BaO | 10–30 | $Na_2O$ | 1–5 |
| $SiO_2$ | 6–25 | $Li_2O$ | 1–5 |
| $SnO_2$ | 2–25 | MgO | 0.5–5 |
| CaO | 2–10 | $P_2O_5$ | 0–5 |
| SrO | 2–10 | $B_2O_3$ | 0–5 |
| $ZrO_2$ | 1–6 | | | with the proviso that the oxides must be within the weight percentages stated above; in addition to the said oxides, it is preferred that the said mass should comprise alkali metal or alkali earth metal fluorides in an amount such that the total fluorine content of the vitreous dielectric material does not exceed 6% by weight.

Preferably the said alkali metal or alkali earth metal fluorides are potassium, sodium or calcium fluoride. The term fluoride as used herein includes silico-fluorides.

One preferred vitreous dielectric material according to the invention has a composition equivalent to a mass comprising the following materials in the amounts specified:

| | Parts by weight | | Parts by weight |
|---|---|---|---|
| $TiO_2$ | 19–20 | $ZrO_2$ | 2–3 |
| PbO | 10–11 | $Sb_2O_3$ | 2–3 |
| BaO | 13–14 | $K_2O$ | 9–10 |
| $SiO_2$ | 19–20 | $Na_2O$ | 4–5 |
| $SnO_2$ | 4–5 | $Li_2O$ | 2–3 |
| CaO | 5–6 | $B_2O_3$ | 2–3 |
| SrO | 3–4 | MgO | 0.5–1.5 |

A further preferred vitreous dielectric material according to the invention has a composition equivalent to a mass comprising the following materials in the amounts specified:

| | Parts by weight | | Parts by weight |
|---|---|---|---|
| $TiO_2$ | 21–22 | $Sb_2O_3$ | 0.5–1.5 |
| PbO | 11–12 | $K_2O$ | 11–12 |
| BaO | 14–15 | $Na_2O$ | 2–3 |
| $SiO_2$ | 9–10 | $Li_2O$ | 1–2 |
| $SnO_2$ | 4–5 | $B_2O_3$ | 0.5–1.5 |
| CaO | 6–7 | MgO | 1.5–2.5 |
| SrO | 3–4 | $P_2O_5$ | 1.5–2.5 |
| $ZrO_2$ | 2–3 | $CaF_2$ | 2–3 |

A further preferred vitreous dielectric material according to the invention has a composition equivalent to a mass comprising the following in the amounts specified:

| | Parts by weight | | Parts by weight |
|---|---|---|---|
| $TiO_2$ | 23–25 | $Sb_2O_3$ | 0.5–1.5 |
| PbO | 12–13 | $K_2O$ | 12–13 |
| BaO | 16–17 | $Na_2O$ | 1–2 |
| $SiO_2$ | 8–9 | $Li_2O$ | 1–2 |
| $SnO_2$ | 4–5 | $B_2O_3$ | 1–2 |
| CaO | 4–5 | MgO | 2–3 |
| SrO | 4–5 | $P_2O_5$ | 1–2 |
| $ZrO_2$ | 2–3 | NaF | 2–3 |

A further preferred vitreous dielectric material according to the invention has a composition equivalent to a mass comprising the following materials in the amounts specified:

| | Parts by weight | | Parts by weight |
|---|---|---|---|
| $TiO_2$ | 24–25 | $Sb_2O_3$ | 0.5–1.5 |
| PbO | 17–18 | $K_2O$ | 10–11 |
| BaO | 13–14 | $Na_2O$ | 1–2 |
| $SiO_2$ | 7–8 | $Li_2O$ | 1–2 |
| $SnO_2$ | 4–5 | $B_2O_3$ | 1–2 |
| CaO | 3–4 | MgO | 2–3 |
| SrO | 4–5 | $P_2O_5$ | 1–2 |
| $ZrO_2$ | 2–3 | KF | 2–3 |

A further preferred vitreous dielectric material according to the invention has a composition equivalent to a mass comprising the following materials in the amounts specified:

| | Parts by weight | | Parts by weight |
|---|---|---|---|
| $TiO_2$ | 25–26 | $K_2O$ | 9–10 |
| PbO | 19–20 | $Na_2O$ | 1–2 |
| BaO | 12–13 | $Li_2O$ | 1–2 |
| $SiO_2$ | 6–7 | $B_2O_3$ | 1–2 |
| $SnO_2$ | 4–5 | MgO | 2–3 |
| CaO | 3–4 | $P_2O_5$ | 1–2 |
| SrO | 3–4 | NaF | 1–2 |
| $ZrO_2$ | 2–3 | KF | 2–3 |
| $Sb_2O_3$ | 0.5–1.5 | | |

In order to produce the vitreous dielectric materials in accordance with the invention the above mentioned oxides and/or fluorides or materials known to be equivalent to them in the manufacture of vitreous materials may be intimately mixed together in known manner and further processed as stated hereinafter.

Also according to the present invention, a process for the production of the above vitreous dielectric materials comprises intimately mixing the above oxides and/or fluorides or materials known to be equivalent to them in the manufacture of vitreous materials, heating them in a non-reducing atmosphere to a temperature of from 900–1300° C. (preferably 1100–1250° C.), keeping them at that temperature until the composition of the mass has become uniform and quenching the uniform mass. Uniformity can be tested by quenching a trial sample and determining its characteristics. Care should be taken that the heating of the constituents of the vitreous dielectric material is effected uniformly.

In the process according to the invention, when one of the starting materials is potassium fluoride, it may be present up to a maximum of 20% by weight of the starting materials whereas any sodium fluoride generally should not exceed 5% by weight and any lithium fluoride should not exceed about 8% by weight. Usually it is preferred to employ a combination of two or all three of the said alkali metal fluorides in an amount such that the total fluorine content of the vitreous dielectric material does not exceed 6% by weight.

By way of example, a number of starting material compositions for producing the vitreous dielectric materials in accordance with the present invention are tabulated in the following table in which the amounts of oxides and fluorides are given in parts by weight. It will be seen that fluorine is expressed as alkali metal fluoride;

it is preferably added to the batch of starting materials in the form of potassium or sodium fluoride. The actual amount of fluorine present in the vitreous dielectric materials is considerably less than in starting materials for the following reason: In the course of the vitrification the fluorides decompose, some of the fluorine is released and the remainder is distributed in the form of complex compounds with the other elements in the starting materials.

*Table.*—OXIDE COMPOSITION OF VITREOUS MATERIAL

| Composition No. | 1 | 2 | 3 | 4 | 5 |
|---|---|---|---|---|---|
| $TiO_2$ | 20 | 21 | 24 | 24 | 26 |
| PbO | 11 | 12 | 12 | 17 | 19 |
| BaO | 13 | 14 | 16 | 14 | 13 |
| $SiO_2$ | 20 | 10 | 8 | 7 | 6 |
| $SnO_2$ | 4 | 5 | 5 | 5 | 4 |
| CaO | 5 | 7 | 5 | 4 | 3 |
| SrO | 3 | 4 | 4 | 4 | 3 |
| $ZrO_2$ | 2 | 3 | 2 | 2 | 3 |
| $Sb_2O_3$ | 2 | 1 | 1 | 1 | 1 |
| $K_2O$ | 10 | 12 | 12 | 10 | 10 |
| $Na_2O$ | 4 | 3 | 2 | 1 | 1 |
| $Li_2O$ | 2 | 2 | 2 | 1 | 1 |
| $B_2O_3$ | 2 | 1 | 2 | 1 | 1 |
| MgO | 1 | 2 | 2 | 3 | 3 |
| $P_2O_5$ | | 2 | 2 | 1 | 1 |
| NaF | | | | 2 | 2 |
| KF | | | | 3 | 3 |
| $CaF_2$ | | | 3 | | |

Mixtures resulting in the oxide compositions shown in the above table will exhibit temperature coefficient of capacitance characteristics depending on the firing cycle. There is a definite relationship between the firing cycle and the electrical characteristics, particularly the temperature coefficient of capacitance of the product. Thus, for any specific firing cycle, products with either negative, zero or positive temperature coefficient can be obtained.

The process of producing the vitreous dielectric materials of the present invention differs from the manufacture of ceramic materials and is similar to the manufacture of viterous enamels. To obtain consistent results intimate mixing of the various starting materials is of importance. In the vitreous dielectric materials of the present invention it is of great importance that uniform electrical properties should be obtained. Hence, the necessity of obtaining the maximum degree of uniformity from the first mixing of any one batch. For this reason the raw batch is preferably wet-milled in ordinary ball mills, it is then allowed to dry and is fired in crucibles at a temperature within the range 900–1300° C. in a non-reducing atmosphere. When the molten material has become sufficiently uniform it may be allowed to cool at a controlled rate and then be crushed into a powder; preferably, however, the molten material is poured into water or other liquid to produce a frit which is then easily milled to any required size. Frits of various types can then be mixed and milled together in known manner to obtain a wide range of dielectrics with predetermined electrical characteristics.

The following examples illustrate the process of the invention without limiting it; the quenching of each batch was effected in 25 seconds.

*Example 1*

A batch of vitreous material totalling 1000 grams listed as Composition 1 in the above table was wet-milled in a ball mill, allowed to dry and placed in a crucible in an electric furnace in a non-reducing atmosphere, and the temperature gradually raised to 1100° C. over a period of three hours. It was then allowed to mature at this temperature for 2½ hours by which time it consisted of a liquid mass. At this stage, the material was quenched by running straight into cold water and the resulting frit had a temperature coefficient of capacitance of —470 parts per million/per 1° C. (p.p.m./° C.). When a similar liquid batch was kept at 1100° C. for 3 hours the temperature coefficient of capacitance of the resulting frit was —400 p.p.m./° C. When a similar liquid batch was kept at 1100° C. for five hours, the temperature coefficient of capacitance of the resulting frit was found to be approximately 0 p.p.m./° C. When a similar batch of material was kept at 1100° C. for seven hours, the temperature coefficient of capacitance of the resulting frit was approximately +150 p.p.m./ C.

Electrical capacitors made from all four batches by known methods had the following characteristics:

Dielectric constant _____ 17
Power factor _____ 0.001
Softening point (° C.) _____ 545

*Example 2*

A batch of 1000 grams of the material listed as Composition 3 in the above table was placed in a crucible in a furnace in a non-reducing atmosphere and the temperature was raised to 1100° C. over a period of 3 hours and kept at this temperature for a further 2½ hours; at the end of this time the material had become a homogeneous mass. The homogeneous mass was then quenched by running it into cold water and capacitors made from the resultant frit using known methods of working, were found to have the following characteristics:

Dielectric constant _____ 27
Power factor _____ 0.002
Temperature coefficient of capacitance p.p.m./° C _____ —350
Softening point (° C.) _____ 566

*Example 3*

The procedure was as indicated in Example 2, but this time the material listed as Composition 5 in the above table was used as the starting material mix. Capacitors made from the resultant frit in known manner were found to have the following characteristics:

Dielectric constant _____ 34
Power factor _____ 0.003
Temperature coefficient of capacitance p.p.m./° C _____ —250
Softening point (° C.) _____ 573

Figure 1 of the accompanying drawings shows the variation of the temperature coefficient of capacitance with time and temperature during the heating step of the process of the invention. When heating the batches for making the vitreous dielectric material to the temperature indicated for each of curves I, II and III it is most important that the heating should take place at a reasonably slow speed in order to obtain uniformity of the heated material and to avoid evaporation of, or other harmful effects on, some of the constituents. The actual speed of heating to the final temperature required for the vitreous material to mature will depend on, other than the considerations already mentioned, the amounts of materials used. This initial heating step is not illustrated in FIGURE 1; only the behaviour of the temperature coefficient of capacitance is shown, once the molten material has reached the temperature stated for each of the three curves. It will thus be seen that when heating is effected to 1200° C. (curve I), after approximately half an hour the temperature coefficient of capacitance of the resulting vitreous dielectric material, if quenched at once, is found to amount to —500 parts per million/° C. It should be mentioned that the temperature coefficient of capacitance is determined by the moment of quenching. After one hour at 1200° C. the temperature coefficient of capacitance has increased to a value of —400/° C. parts per million/° C. After about an hour and fifty minutes at 1200° C. it is seen that the temperature coefficient of capacitance is roughly zero. From that point on until the temperature has been maintained for three hours the temperature coefficient of capacitance becomes positive until it reaches a maximum value of +300 parts per million/° C. Continued maintenance of the temperature does not increase the temperature coefficient of capacitance of the vitreous material. It will be seen from the other two curves shown in FIGURE 1 that a lowering of the temperature, at which the vitreous material is maintained, to values of 1100° C. (curve II) and 1000° C. (curve III) does not affect the final value of the temperature coefficient of capacitance which remains 300 parts per million/° C.; the said lower temperatures merely have the effect of lengthening the amount of time required to reach the said value. For example, when the temperature at which the vitreous material is maintained is 1000° C., the final value of 300 parts per million/° C. is reached only after about five hours.

The actual heating of the vitreous material, as already mentioned, should be effected to temperatures of from 900–1300° C. The lower limit is given by the fact that below 900° C. it would take too long to reach the desired positive value of the temperature coefficient of capacitance. The upper limit is given by the fact that the material of which the vitreous material is made would deteriorate or no crystalline matter might be present but only an amorphous glass above 1300° C.

As regards the quenching, this should be done as quickly as possible; if quenching takes more than a time of the order of 20–30 seconds the characteristics of the material obtained from various portions of the same batch will show some variations. However, as the vitreous dielectric material is to be finely ground and thoroughly mixed when it is made up as a slip to be used in the manufacture of capacitors a certain amount of tolerance is permissible. It is clearly desirable that there is the minimum variation throughout a given batch, and it is for this reason that as short a quenching time as possible should be achieved.

Each particular composition falling within the general ranges stated above for the vitreous dielectric material of the invention will give a maximum value for the temperature coefficient of capacitance. In Example 1 the maximum value of the temperature coefficient of capacitance for the composition used therein is +150. In the curves given in FIGURE 1 the maximum value is +300 parts per million/° C.; the material used for establishing the curves of FIGURE 1 was Composition 5 of the above table.

The vitreous dielectric material according to the present invention, as already stated, may be used to make electrical capacitors; these may be constructed in accordance with the method described and claimed in Patent Application S.N 457,434 filed September 21, 1954 and now U.S. Patent 2,956,219.

The firing cycle will vary with the weight of the batch and size and composition of the crucible employed; compositions of crucibles used for making the vitreous materials in accordance with the invention vary and each crucible must therefore have its characteristics determined.

X-ray diffraction using a cobalt target ($K_\alpha$ line) gives a clear pattern showing that at least part of the material produced in the above example contains matter having a definite crystalline structure.

The X-ray diffraction patterns using a cobalt target ($K_\alpha$ line) show this structure, FIGURE 2 corresponding to the frit obtained in Example 1, and FIGURE 3 corresponding to the frit obtained in Example 2.

It should be noted that the electrical characteristics referred to throughout this specification were measured at a frequency of 1 megacycle per second.

Although the present invention has been described with particular reference to specific details, it is not intended that such details shall be regarded as limitations upon the scope of the invention except insofar as included in the accompanying claims.

I claim:
1. A process for the production of a vitreous dielectric material which contains a crystalline phase as evidenced by its X-ray diffraction pattern, has a softening point below 700° C. and has a high coefficient of thermal expansion matching that of copper, which comprises forming a glass batch of the following oxides in the proportions specified:

| | Parts by weight | | Parts by weight |
|---|---|---|---|
| $TiO_2$ | 14–35 | $Sb_2O_3$ | 0.5–3 |
| $PbO$ | 10–30 | $K_2O$ | 7–20 |
| $BaO$ | 10–30 | $Na_2O$ | 1–5 |
| $SiO_2$ | 6–25 | $Li_2O$ | 1–5 |
| $SnO_2$ | 2–25 | $MgO$ | 0.5–5 |
| $CaO$ | 2–10 | $P_2O_5$ | 0–5 |
| $SrO$ | 2–10 | $B_2O_3$ | 0–5 |
| $ZrO_2$ | 1–6 | | | the oxides of titanium, barium, lead, tin, calcium and strontium constituting from 50 to 70% by weight of the mixture and the oxides of potassium, sodium and lithium constituting from 6 to 25% by weight of the mixture, intimately mixing said constituents, heating them in a non-reducing atmosphere to a temperature of 900 to 1300° C., keeping them at that temperature for a period at least sufficient to ensure that the resulting liquid mass has become uniform and quenching the uniform mass.

2. A process according to claim 1 in which the temperature to which the constituents are heated is from 1100 to 1250° C.

3. A process according to claim 1 in which quenching is effected by pouring the liquid uniform mass into water.

4. A process as claimed in claim 1 in which at least part of at least one of the oxides of potassium, lithium and sodium is replaced by a corresponding amount of the corresponding fluoride, the amount of fluoride being such that the total fluoride content of the vitreous dielectric material does not exceed 6% by weight.

5. A process as claimed in claim 1 in which the said mass further comprises calcium fluoride in an amount such that the total fluoride content of the vitreous dielectric material does not exceed 6% by weight.

6. A process for the production of a vitreous dielectric material which contains a crystalline phase as evidenced by its X-ray diffraction pattern, has a softening point below 700° C. and has a high coefficient of thermal expansion matching that of copper, which comprises forming a glass batch of the following oxides in the proportions specified:

| | Parts by weight | | Parts by weight |
|---|---|---|---|
| $TiO_2$ | 20 | $ZrO_2$ | 2 |
| $PbO$ | 11 | $Sb_2O_3$ | 2 |
| $BaO$ | 13 | $K_2O$ | 10 |
| $SiO_2$ | 20 | $Na_2O$ | 4 |
| $SnO_2$ | 4 | $Li_2O$ | 2 |
| $CaO$ | 5 | $B_2O_3$ | 2 |
| $SrO$ | 3 | $MgO$ | 1 | the oxides of titanium, barium, lead, tin, calcium and strontium constituting from 50 to 70% by weight of the mixture and the oxides of potassium, sodium and lithium constituting from 6 to 25% by weight of the mixture, intimately mixing said constituents, heating them in a non-reducing atmosphere to a temperature of 900 to 1300° C., keeping them at that temperature for a period at least sufficient to ensure that the resulting liquid mass has become uniform and quenching the uniform mass.

7. The product formed by the process of claim 1.
8. The product formed by the process of claim 4.

9. The product formed by the process of claim 5.
10. The product formed by the process of claim 6.

References Cited in the file of this patent

UNITED STATES PATENTS

| | | |
|---|---|---|
| 2,069,903 | Soyck et al. | Feb. 9, 1937 |
| 2,220,765 | Hirose et al. | Nov. 5, 1940 |
| 2,220,775 | Navias | Nov. 5, 1940 |
| 2,277,733 | Wainer et al. | Mar. 31, 1942 |
| 2,347,187 | Frost | Apr. 25, 1944 |
| 2,377,910 | Wainer et al. | June 12, 1945 |
| 2,576,379 | Woodcock et al. | Nov. 27, 1951 |
| 2,721,182 | Clement | Oct. 18, 1955 |
| 2,738,284 | Calis | Mar. 13, 1956 |
| 2,863,782 | Eubank et al. | Dec. 9, 1958 |